(12) United States Patent
Siddiqui et al.

(10) Patent No.: US 11,554,785 B2
(45) Date of Patent: Jan. 17, 2023

(54) DRIVING SCENARIO MACHINE LEARNING NETWORK AND DRIVING ENVIRONMENT SIMULATION

(71) Applicant: Foresight AI Inc., Los Gatos, CA (US)

(72) Inventors: Matheen Siddiqui, Long Beach, CA (US); Cheng-Yi Lin, Santa Clara, CA (US); Chang Yuan, Los Gatos, CA (US)

(73) Assignee: Foresight AI Inc., Los Gatos, CA (US)

( * ) Notice: Subject to any disclaimer, the term of this patent is extended or adjusted under 35 U.S.C. 154(b) by 625 days.

(21) Appl. No.: 16/567,114

(22) Filed: Sep. 11, 2019

(65) Prior Publication Data

US 2020/0353943 A1 Nov. 12, 2020

Related U.S. Application Data

(60) Provisional application No. 62/844,726, filed on May 7, 2019.

(51) Int. Cl.
*B60W 50/06* (2006.01)
*G06N 3/08* (2006.01)
(Continued)

(52) U.S. Cl.
CPC ........... *B60W 50/06* (2013.01); *G05B 13/027* (2013.01); *G06N 3/08* (2013.01); *G06T 7/20* (2013.01); *G06V 20/41* (2022.01); *B60W 2050/0075* (2013.01); *B60W 2556/45* (2020.02); *G06T 2207/10016* (2013.01); *G06T 2207/10032* (2013.01); *G06T 2207/20081* (2013.01); *G06T 2207/30252* (2013.01)

(58) Field of Classification Search
CPC ......... B60W 50/06; B60W 2050/0075; B60W 2556/45; G05B 13/027; G06N 3/08; G06N 3/0454; G06N 3/0472; G06T 7/20; G06T 2207/10016; G06T 2207/10032; G06T 2207/20081; G06T 2207/30252; G06T 2207/30232; G06T 2207/30236; G06T 2207/30241; G06T 7/246; G06T 2207/20084; G06V 20/41; G06V 20/176; G06V 20/182; G08G 1/0129; G08G 1/04; G08G 5/0013; G08G 5/0078; G08G 1/012

See application file for complete search history.

(56) References Cited

U.S. PATENT DOCUMENTS

| 11,036,232 B2 * | 6/2021 | Shkurti | ................. G05D 1/0257 |
| 11,328,219 B2 * | 5/2022 | Zhang | ..................... G06F 30/20 |
| 2019/0108384 A1 * | 4/2019 | Wang | ..................... G06V 20/49 |

* cited by examiner

*Primary Examiner* — Michael E Teitelbaum
(74) *Attorney, Agent, or Firm* — Cognition IP, P.C.; Edward Steakley

(57) ABSTRACT

Methods, systems, and apparatus, including computer programs encoded on computer storage media, for generating a driving scenario machine learning network and providing a simulated driving environment. One of the operations is performed by receiving video data that includes multiple video frames depicting an aerial view of vehicles moving about an area. The video data is processed and driving scenario data is generated which includes information about the dynamic objects identified in the video. A machine learning network is trained using the generated driving scenario data. A 3-dimensional simulated environment is provided which is configured to allow an autonomous vehicle to interact with one or more of the dynamic objects.

14 Claims, 10 Drawing Sheets

(51) Int. Cl.
*G05B 13/02* (2006.01)
*G06T 7/20* (2017.01)
*G06V 20/40* (2022.01)
*B60W 50/00* (2006.01)

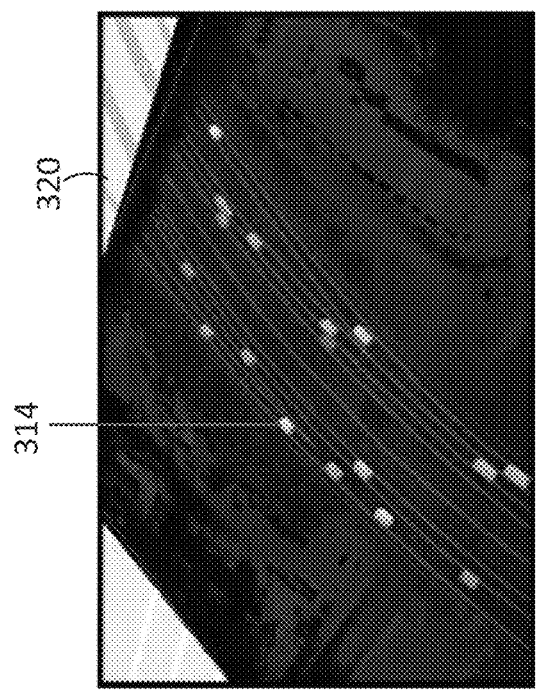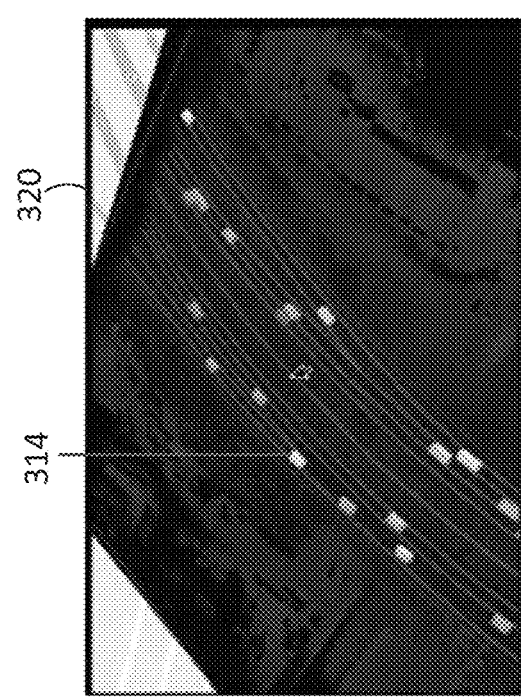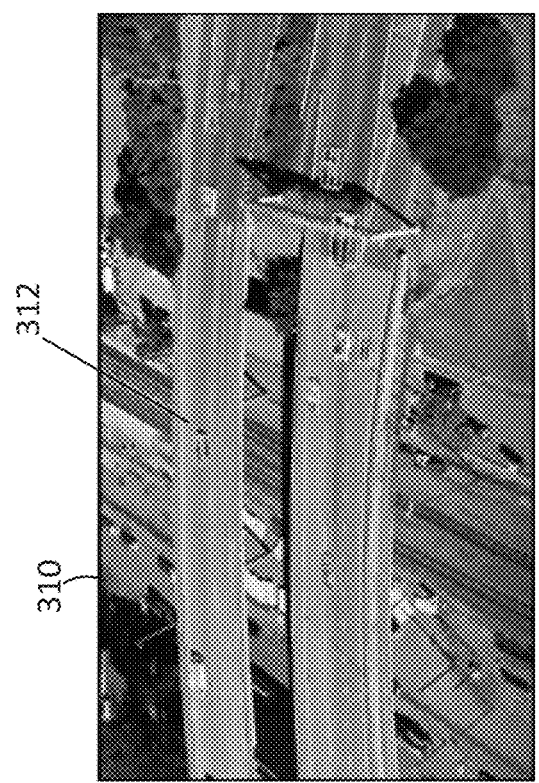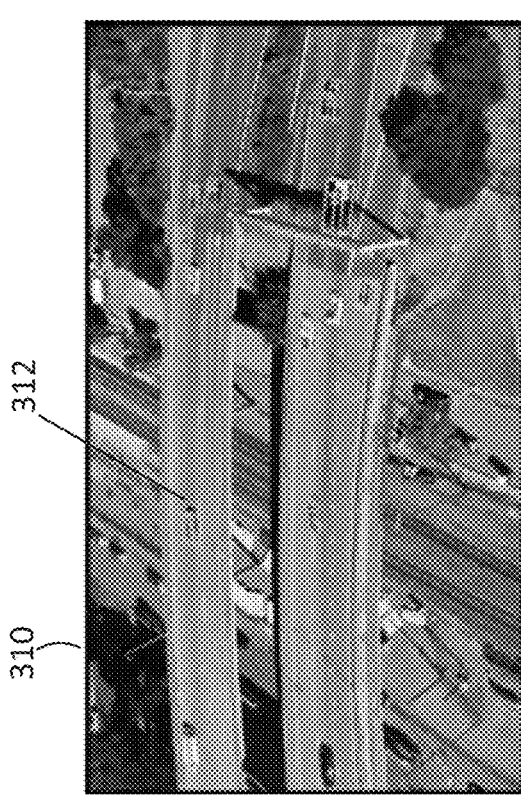
FIG. 3A
FIG. 3B

DRIVING SCENARIO MACHINE LEARNING NETWORK AND DRIVING ENVIRONMENT SIMULATION

CROSS-REFERENCE TO RELATED APPLICATION

This application claims the benefit of U.S. Provisional Application No. 62/844,726, filed on May 7, 2019, which is hereby incorporated by reference in its entirety.

BACKGROUND

Self-driving vehicles are often trained where a physical vehicle is driven about a road network and test data for a geographic area is obtained by the vehicle itself. The vehicle collects data about environmental objects from the vehicle's point-of-view using onboard sensors such as Lidar, Radar, Sonar, cameras and/or GPS systems. Virtual driving simulations may be performed using the collected data to simulate driving scenarios. However, these simulations are limited by the data as it was obtained solely from the vehicle's point-of-view. When originally collecting the environmental object data, the physical vehicle only can collect data within the range of the vehicle's onboard sensors. Objects in the area of the road network may have been occluded from the view of the vehicle's onboard sensors, or the objects may have been out of range from the vehicle's onboard sensors. Environmental object data for an area of a road network obtained by a physical driving vehicle is often lacking and incomplete which in turn causes a less than realistic virtual simulation.

SUMMARY

Described herein is an exemplary system for generating a driving scenario machine learning network and providing a simulated driving environment. In general, one innovative aspect of the subject described in this specification can be embodied in systems, computer readable media, and methods that include generating driving scenario data from video files, training a machine learning network with the generated driving scenario data, and providing a 3-dimensional simulated environment allowing interaction with dynamic objects in a driving scenario. One of the operations is performed by receiving video data that includes multiple video frames depicting an aerial view of vehicles moving about an area. The video data is processed and driving scenario data is generated which includes information about the dynamic objects identified in the video. A machine learning network is trained using the generated driving scenario data. A 3-dimensional simulated environment is provided which is configured to allow an autonomous vehicle to interact with one or more of the dynamic objects. A performance score is computed to evaluate the autonomous vehicle's safety, comfort, smoothness based on the driving scenario data.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 3A illustrates an example of 2-dimensional aerial video data converted to 3-dimensional dynamic object data for the generation of driving scenario data.

FIG. 3B illustrates an example of 2-dimensional aerial video data converted to 3-dimensional dynamic object data for the generation of driving scenario data.

DETAILED DESCRIPTION

Figure 1:
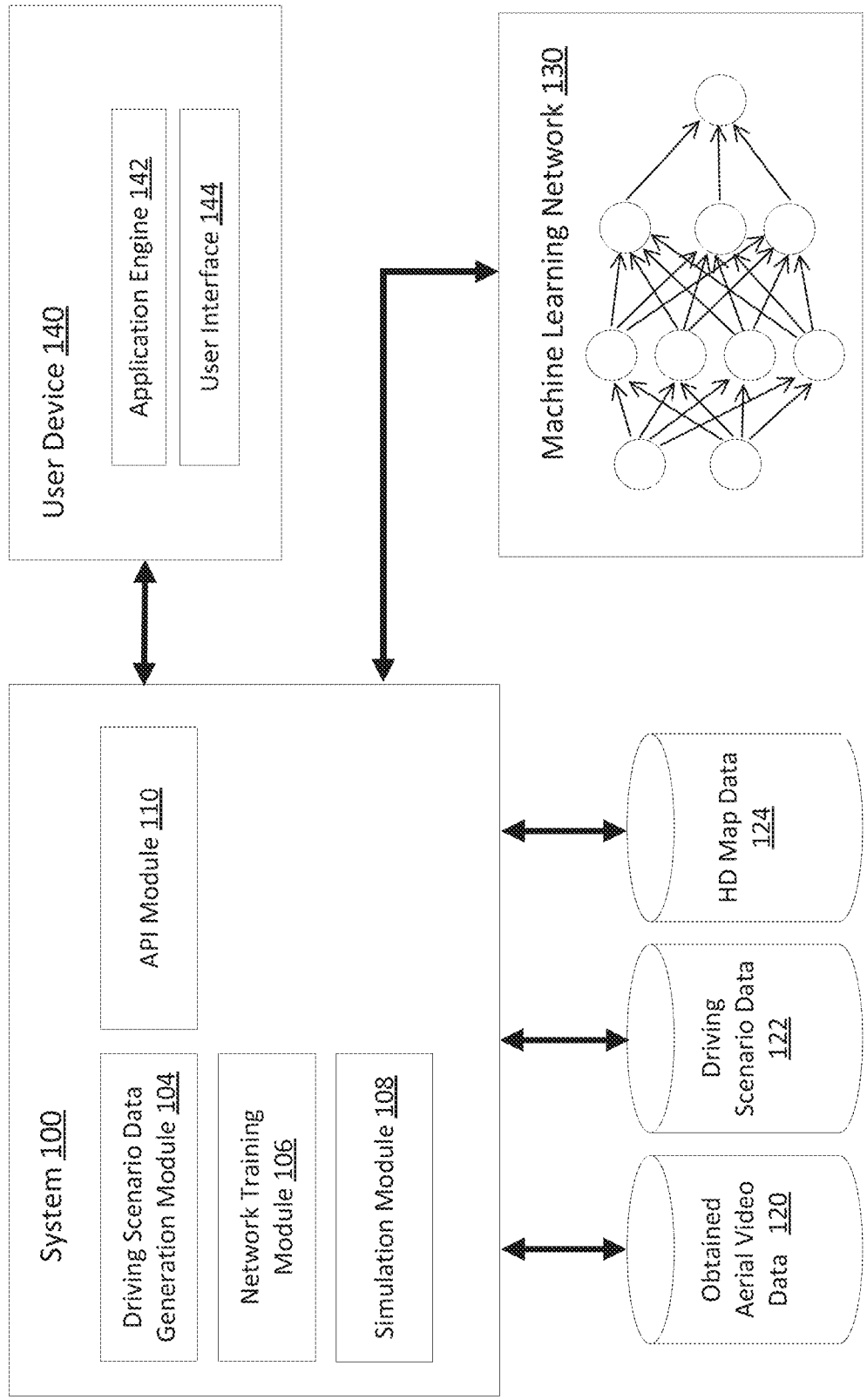
FIG. 1 illustrates a block diagram of an example system utilized in training a machine learning model and simulating a driving environment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 illustrates a block diagram of an example system 100 for training a machine learning network 130 with driving scenario data 122 and for providing a simulated driving environment. The system 100 includes a driving scenario data generation module 104, a network training module 106, a simulation module 108 and an application program interface (API) module 110. The driving scenario data generation module 104 processes obtained aerial video data 120 to generate driving scenario data 122. The network training module 106 trains a machine learning network 130 with the driving scenario data 122. Based on the trained machine learning network 130, the simulation module 108 generates a real-world simulated driving environment for training self-driving cars with multiple driving scenarios. The system 100 uses high definition (HD) base map data 124 along with driving scenarios to allow simulated control of vehicles by way of the API module 110. While the databases 120, 122 and 124 are displayed separately, the databases and information maintained in a database may be combined together or further separated in a manner the promotes retrieval and storage efficiency and/or data security.

Figure 2:
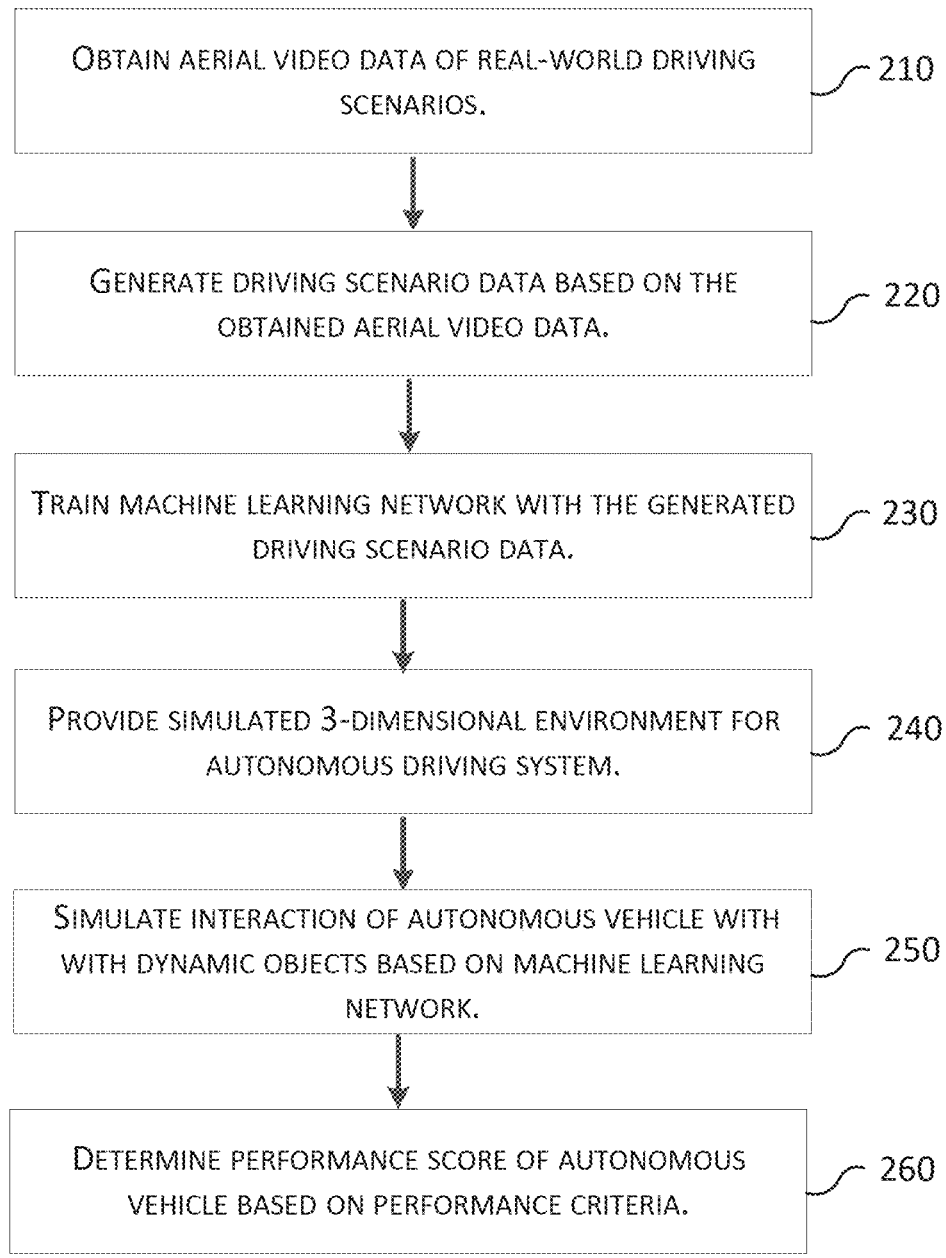
FIG. 2 illustrates a flowchart of an example process for training a machine learning model with driving scenarios.

Now referring to FIG. 2, the figure illustrates a block diagram of an example process for training a machine learning network with driving scenario data and providing a simulated 3-dimensional driving environment. The system 100 obtains video files that includes video footage depicting an aerial view of real-world driving scenarios (block 210). The system 100 may store the video files in a database or other file storage system. Via the driving scenario data generation module 104, the system 100 generates driving scenario data 122 based on the obtained video data (block 220). The system 100 processes the video files and creates driving scenario data 122 by evaluating video frames and identifying dynamic objects in the video files. The system 100 may store the driving scenario data 122 in a database or other file storage system. The system 100 determines trajectories, velocities, goals and other information about the dynamic objects identified in the obtained aerial video data 120. Via the network training module 106, the system 100 trains the machine learning network 130 using imitation and/or reinforcement learning methods based on the generated driving scenario data 122 (block 230). Via the simulation module 108 and API module 110, the system 100 provides a simulated 3-dimensional environment for an external autonomous driving system (block 240). Then the system 100 simulates interaction of an autonomous vehicle with the dynamic objects based on the trained machine learning network (block 250). The system 100 records the sequential movement of the autonomous vehicle and determines a performance score for the simulation session based on one or more performance criteria: safety, comfort, smoothness and efficiency (e.g., how fast the vehicle achieved the goal).

Obtaining Aerial Video Data of Real-World Driving Situations

FIGS. 3A and 3B illustrate an example of 2-dimensional aerial video data 120 converted to 3-dimensional dynamic object data for use as driving scenario data 122. FIGS. 3A and 3B each depict a video frame 310 at two different time instances. FIGS. 3A and 3B also depict a graphical representation 320 of dynamic objects (e.g., vehicles) identified in the video frames 310. In one embodiment, Unmanned Aerial Vehicles (UAVs) capture real-world videos of vehicles driving about various geographic locations (e.g., different cities or towns), at various road network types (e.g., intersections, bridges, roadways, streets, dirt roads, highways, roundabouts, etc.), in different traffic conditions (e.g., light, moderate, heavy traffic), and in different ambient situations (e.g., time of day, lighting conditions, weather conditions, etc.). In addition to capturing aerial video, the UAVs, using on-board sensors, may capture atmospheric and other conditions about the environment in which the video was captured. For example, the UAV may collect ambient temperatures using a temperature sensor, the available lighting conditions using a photoelectric sensor, atmospheric pressure using a barometer and humidity using a humidity sensor. Also, the UAV captures its geo-spatial location (e.g., GPS or GNSS coordinates) while capturing the video. The UAV (or via a later system 100 processing step) correlates the geo-spatial data and collected sensor data to the frames of the captured video based on a time stamp of when the video and sensor data was generated. U.S. patent application Ser. No. 62/821,905 filed Mar. 21, 2019, entitled Systems and Methods for Localization is hereby incorporated by reference in its entirety; the application describes dynamic aerial image acquisition and point cloud generation.

Generating Driving Scenario Data Based on the Obtained Aerial Video Data

U.S. patent application Ser. No. 62/727,986 filed Sep. 6, 2018, entitled Intelligent Capturing of a Dynamic Physical Environment is hereby incorporated by reference in its entirety; the application describes embodiments for generating a high-fidelity three-dimensional representation of a physical environment that can include dynamic objects and scenarios. The described scenarios of the 62/727,986 application may be used as driving scenarios as further described herein.

The video frames 310 of FIGS. 3A and 3B illustrate two frames of obtained aerial video 120 showing multiple vehicles traveling over a bridge. In the example, the vehicles on the upper portion of the bridge are traveling from right to left. The vehicles on the lower portion of the bridge are traveling from left to right. For example, in FIG. 3A vehicle 312 is shown in a first position at a first time instant, and in FIG. 3B vehicle 312 is shown in a second position at a second time instant.

The driving scenario data generation module 104 processes the obtained aerial video data 120 and generates driving scenario data 122. The system 100 identifies dynamic objects in the video frames (e.g., by comparison of moving pixel groups from one video frame to another). Dynamic objects are evaluated objects that are determined by the system 100 to be moving within an evaluated area. The type of dynamic objects may be classified by the system 100, for example, based on the relative pixel group size or appearance of the identified dynamic object in the video frames (e.g., a car, a truck, a semi with trailer, a bicycle, a pedestrian, etc.). The system 100 may categorize dynamic objects into different vehicle types and/or object types (e.g., cars, trucks, motorcycles, bicyclists and/or vehicles and pedestrians). Also, the system 100 may categorize the dynamic object types by characteristics of the object (e.g., 2-wheel vehicle or a 4-wheel vehicle, color of the vehicle, dimensions of the vehicle).

The obtained aerial video data 120 may be correlated to a vectorized base map data 124 that includes the outlines of roadways, streets and other road network structures. The system 100 may correlate the base map data 124 to the obtained aerial video data 120 by way of the geo-spatial location coordinates of the UAV where the video was obtained and to the geo-spatial coordinates of the base map data 124. Additionally, the system 100 may correlate the base map data 124 to a video frame based on feature extraction or edge detection of road features in the video frame and align the road features from the video frame to the vectorized base map data 124.

The system 100 evaluates a dynamic object's velocity and direction by comparing a dynamic object in one video frame to the next video frame (i.e., from one time instant to the next time instant). For example, the system 100 may identify the movement of a dynamic object and determine a rate of speed with which the dynamic object moves in one video frame as compared to the next video frame. The system 100 also may determine a trajectory of the dynamic object by evaluating directional changes of the dynamic object from one video frame as compared to the next video frame. For example, the system 100 may determine a centroid of a dynamic object and determine the movement of the centroid from one frame to another. Also, since the obtained aerial video data 120 may be correlated to base map data 124, the system 100 may use the base map to determine how far a dynamic object has moved about the base map and in which direction. The system 100 then may determine a distance the dynamic object has moved between two video frames or within a series of video frames. The system 100 then may determine a dynamic object's velocity and direction from one time instant to another time instant and/or from an initial time instant over a series of time instants (e.g., over a 5 second time window).

Referring back to FIGS. 3A and 3B, an example graphic representation of extracted driving scenario data 320 from the video frames 310 is illustrated. The system 100 may determine a size of a dynamic object based on the overall size of the pixel group for a dynamic object. For example, a sedan would have a smaller pixel group size in a video frame as compared to a truck which would have a larger pixel group size in the video frame. The system 100 generates a 3-dimensional bounding box based on the pixel group size of for each of the identified dynamic object.

In the graphic representation 320, various dynamic objects are depicted with the 3-dimensional bounding boxes imposed over a vector base map. In the example, the dynamic objects on the upper portion of the representation are traveling from right to left. The dynamic objects on the lower portion of the representation are traveling from left to right. For example, in FIG. 3A vehicle 314 is shown in a first position at a first time instant, and in FIG. 3B vehicle 314 is shown in a second position at a second time instant.

The system 100 stores the generated driving scenario data 120 in a database for use by the system to train a machine learning network 130. Obtained aerial videos of multiple real-world driving scenarios 104 may be processed to generate a variety of driving scenario data 120.

Figure 4A:
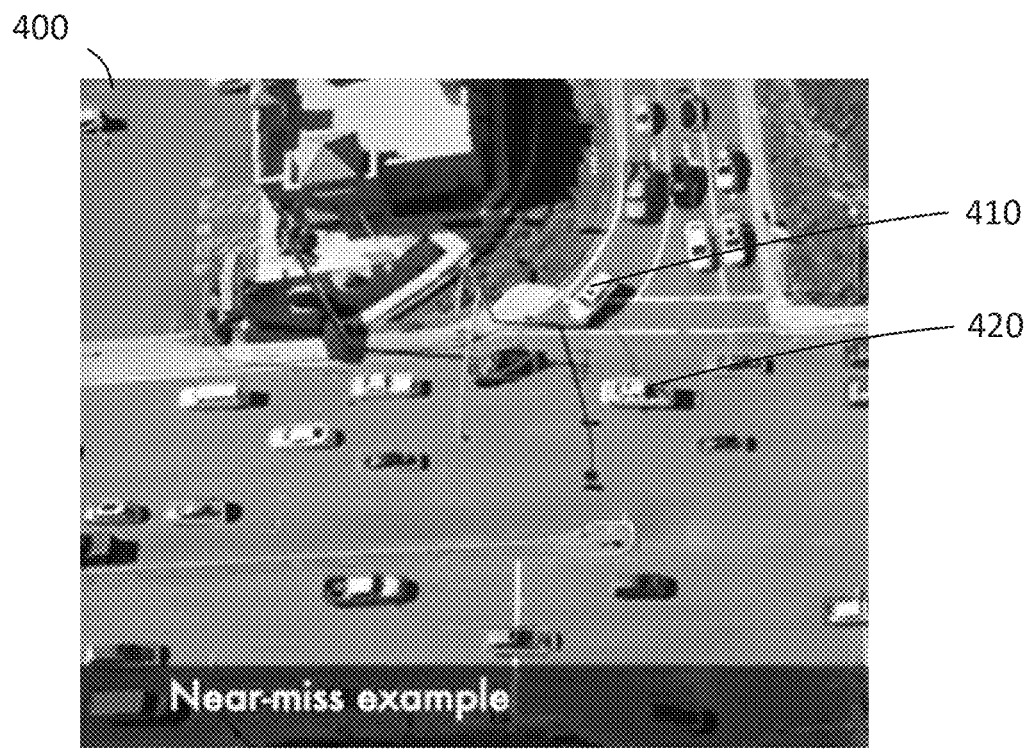
FIG. 4A illustrates an example of 2-dimensional aerial video data converted to 3-dimensional dynamic object data for the generation of driving scenario data.
Figure 4B:
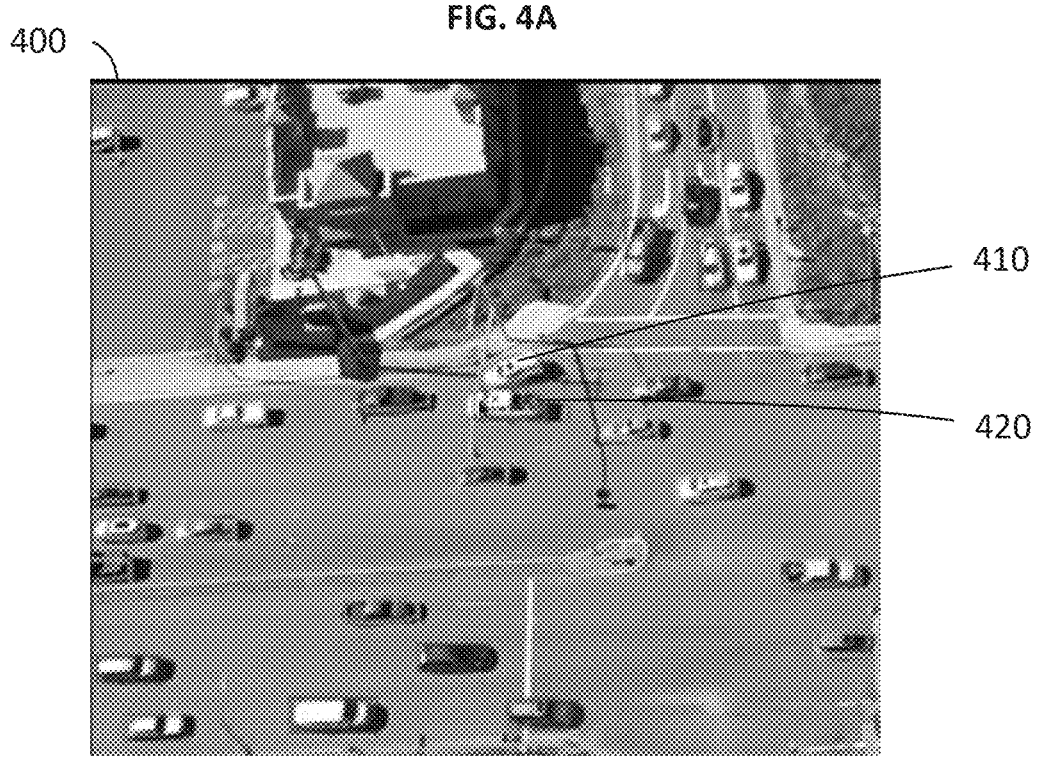
FIG. 4B illustrates an example of 2-dimensional aerial video data converted to 3-dimensional dynamic object data for the generation of driving scenario data.

FIGS. 4A and 4B illustrate an example of 2-dimensional aerial video data converted to 3-dimensional dynamic object data for the generation of driving scenario data. In this example, a near-miss real-world driving situation is shown with two vehicles 410 and 420 almost colliding. In FIG. 4A, at a first time instant in the video frame 400 vehicle 410 is slowly tying to merge into on-coming traffic. Meanwhile, vehicle 420 is moving along with the flow of traffic, but also is trying to merge over to the far-right lane. A couple of seconds later, after the time instant of video frame 400, FIG. 4B illustrates a near collision of vehicles 410 and 420. Here vehicle 420 almost impacts vehicle 410. In this case, the driver of vehicle 410 adjusts the vehicle 410 to maneuver slightly to the right, and then comes to a complete stop. Likewise, the driver of vehicle 420 maneuvers slightly to the left to avoid the oncoming vehicle 410. This situation exemplifies a prime example of a real-world driving scenario which may be used to train the machine learning network 130. The system 100 generates from the obtained aerial video data 120 one or more of the following information: dynamic object location information, dynamic object size information, dynamic object classification information, dynamic object speed information, heading information and goal (destination) information. The system 100 uses this generated information as driving scenario data 122 to train the machine learning network 130.

FIGS. 5A-5F illustrates an example of driving scenario data 122 graphically representing dynamic objects with trajectory information. FIGS. 5A-5F depict a subject dynamic object (also referred to as the Ego vehicle) 504, a vector base map 502, an intended destination 508 of the Ego vehicle 504, and other dynamic objects (e.g., other vehicles) 510. The dynamic objects 504, 510 are represented by polygonal shaped boxes depicted on a local vectorized base map 502. The destination 508 of the Ego vehicle 504 is represented by a straight line to an end-point of the where the Ego vehicle intends to go. In the successive FIGS. 5A-5F, the straight line to the end-point becomes shorter as the subject vehicle maneuvers closer to the destination 508.

Figure 5A:
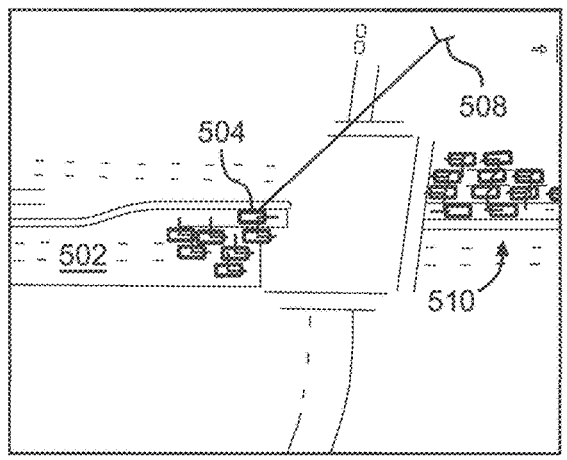
FIG. 5A illustrates an example of graphically represented driving scenario data including dynamic objects with trajectory information.
Figure 5B:
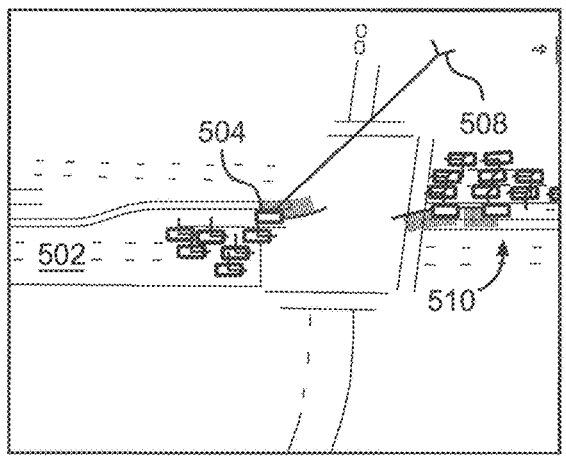
FIG. 5B illustrates an example of graphically represented driving scenario data including dynamic objects with trajectory information.
Figure 5C:
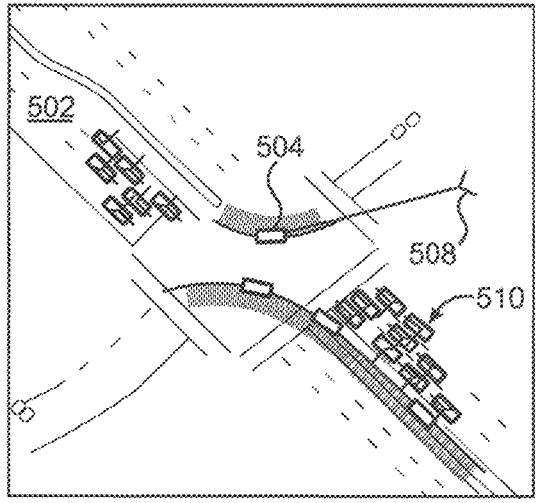
FIG. 5C illustrates an example of graphically represented driving scenario data including dynamic objects with trajectory information.
Figure 5D:
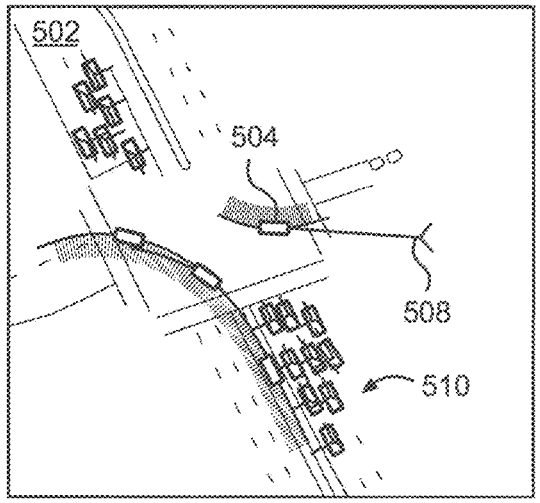
FIG. 5D illustrates an example of graphically represented driving scenario data including dynamic objects with trajectory information.
Figure 5E:
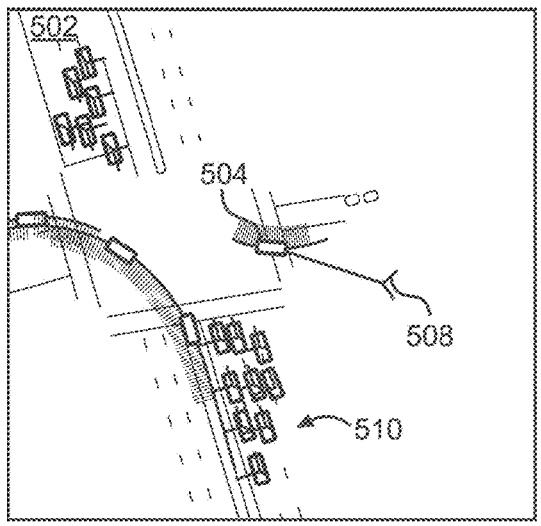
FIG. 5E illustrates an example of graphically represented driving scenario data including dynamic objects with trajectory information.
Figure 5F:
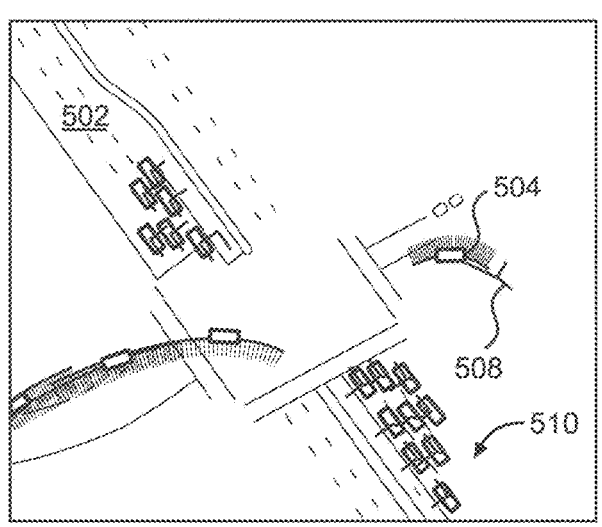
FIG. 5F illustrates an example of graphically represented driving scenario data including dynamic objects with trajectory information.

FIG. 5A initially shows the Ego vehicle 504 stopped waiting at a red-light signal. FIG. 5B then shows the Ego vehicle 504 beginning to accelerate and to turn left. The Ego vehicle 504 then continues to turn left at FIGS. 5C and 5D. Then at FIG. 5E, the Ego vehicle 540 begins to go straight, and then turn right in FIG. 5F while almost reaching the destination 508. In the Figures, other vehicles 510 are also depicted maneuvering about the local map.

Trajectory information of the Ego vehicle 508 and the other vehicles 510 is depicted. A short line extending from behind the vehicle represents an actual previous path that a vehicle has taken over a pre-determined time interval. A short line in front of the vehicle represents an intended path of the vehicle over a pre-determined time interval. Also, a velocity vector is shown as a consecutive series of parallel lines disposed before and after the vehicles 508, 510 illustrating the velocity of a vehicle. The velocity vector is also depicted as to a pre-determined time interval. In the instance where a vehicle is not moving, a velocity vector is not depicted. A velocity vector behind a moving vehicle represents an actual velocity vector of a vehicle 508, 510. A velocity vector in front of a moving vehicle represents a predicted velocity vector of a vehicle 508, 510 as to the particular time instant.

Training a Machine Learning Network with the Generated Driving Scenario Data

One way of understanding the process of driving a vehicle is to consider driving as a series of goals and controls over a sliding window of time. A control may be considered as steering angle and speed adjustments (e.g., control points) to a vehicle that occur at a particular time instance within the sliding window of time. For example, in a typical manual driving situation a goal may be determined by what a vehicle navigation system instructs a human drive to do while en route to an intended destination. It is possible to manually navigate a vehicle by entering a destination address (i.e., a goal) into a navigation system (e.g., route mapping software) and then physically maneuvering the vehicle by following the directions provided by the navigation system. Viewed this way, the process of driving is translating a sliding window of goals into local decisions. In other words, the process of driving may be viewed as an agent that transforms instructions into vehicle controls over multiple instance over a time period. For example, driving a vehicle to work may require the driver to manually control the vehicle at multiple time instances during the route to work. The overall route may have an overall travel time based on the directions and the velocities that the vehicle has incurred from the point of departure to its destination.

At each time instant the vehicle has particular states in which the vehicle operates. The world around the vehicle, the destination of the vehicle (e.g., a waypoint). These inputs to a human driver are translated into actual controls such as a steering angle (e.g., the steering wheel rotating left or right), a velocity of the vehicle (e.g., zero speed, a steady speed, and an increasing or decreasing speed). The process of driving then may be viewed as having a goal (e.g., where the vehicle is going), the state of the vehicle (e.g., what the vehicle is doing, such as turning, accelerating or decelerating), and the state of the world in which the vehicle operates (e.g., other vehicles, the road, structures, obstacles, traffic lights and signs, etc.). At the core of self-driving then is translating the goal, state of the vehicle, and state of the world into choices to be made by a self-driving vehicle.

Figure 6:
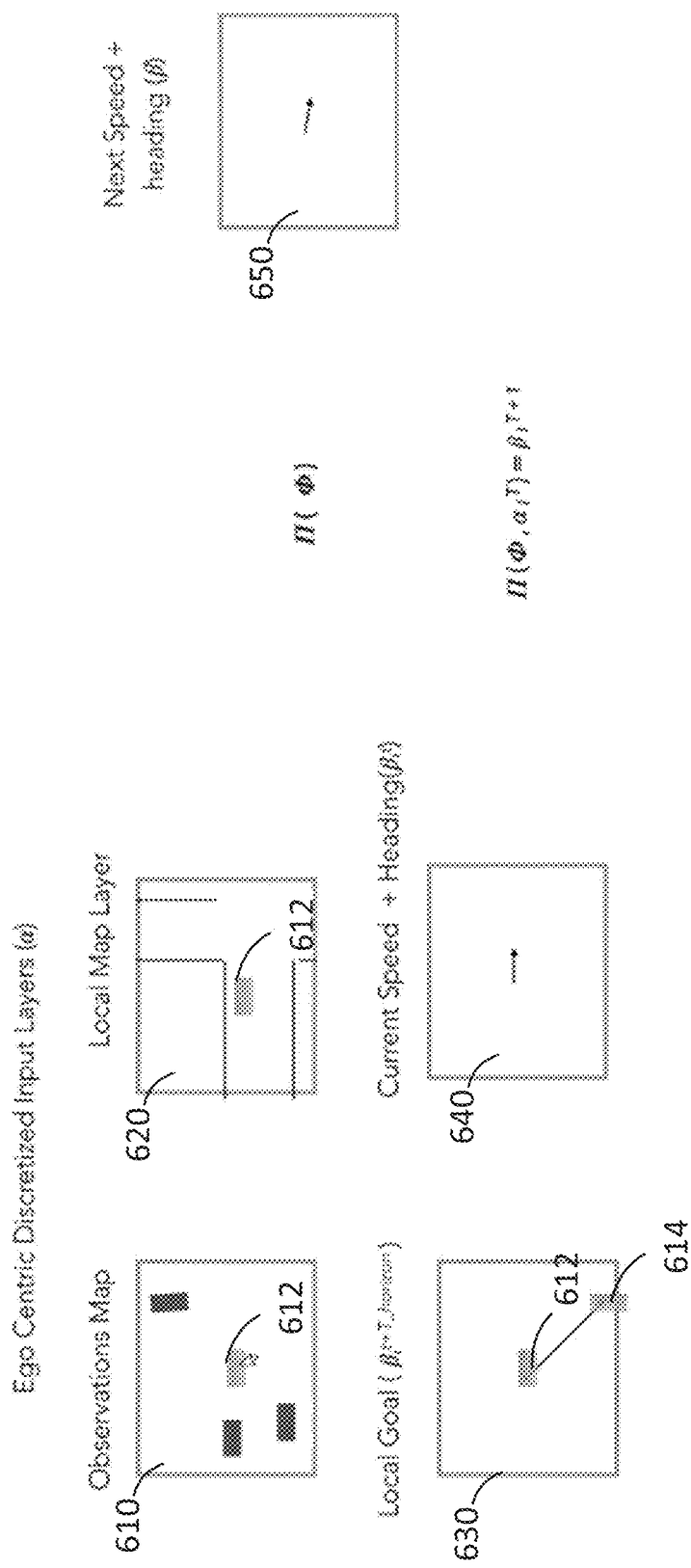
FIG. 6 illustrates an example of a co-driving agent structure where the system evaluates generated driving scenario data.

FIG. 6 illustrates an example of a co-driving agent structure where the system 100 evaluates the generated driving scenario data 122 and renders the inputs to determine a control signal. This example illustrates a supervised learning method where the system 100 uses the inputs to determine a next control signal. The system 100 evaluates driving scenario data 122 based on different inputs related to the Ego vehicle 612. Via the network training module 106, the system 100 may train the machine learning network 130 using the vehicle scenario data 122.

The system 100 may use various inputs for a particular time instant. These inputs may include, but are not limited to, an observations map 610 (i.e., a current state of dynamic objects around or in proximity to the Ego vehicle 612), a local map layer 620 (i.e., a local vector map located indicating the road network and structures around the Ego vehicle 612), a local goal 630 (i.e., an intended destination 614 of the Ego vehicle 612), and a current vehicle state 640 (i.e., a speed and heading of the Ego vehicle 612).

Based on the system 100 calculating the trajectories for the Ego vehicle 612, the system 100, may then determine what the control 650 should be at the next time instant 650 (e.g., next speed and heading, velocity, angular velocity, and/or just a position or a delta). Based on the inputs 610, 620, 630, 640, the system 100 determines an output of the next control for the speed and heading of the vehicle.

In training the machine learning network 130, with given inputs 610, 620, 630, 640 for the Ego vehicle 612, the system 100 may learn how to control the Ego vehicle 612 in such a way that that the Ego vehicle 612 achieves its high-level goal (e.g., the vehicle's intended destination). The system 100 may train the machine learning network 130 such that a dynamic object makes driving decisions based upon other dynamic objects' behavior in a particular road network topology. For a given road network topology (e.g., an intersection or section of road), the system 100 identifies and tracks all dynamic objects (e.g., vehicles in the driving scenario data 122). For each identified dynamic object, the system 100 determines the dynamic object's local goal (e.g., by determining whether the dynamic object is moving straight, turning right or left by a certain number of degrees). For example, the dynamic object's local goal may be the final position of the dynamic object at a particular time interval.

The system 100 may determine the local motion of a dynamic object (i.e., the control signal at the next step or interval in time) where LM@t+period_of_time=compute_function (G, RC, Objs, EgoState). LM is the local motion of the Ego vehicle (i.e., the movement controls of the Ego vehicle). For example, the system may determine for a particular time interval (t)+period of time (e.g., 1 second) a speed and steering angle or a velocity, or a serious of control points (i.e., a driving decision for the Ego vehicle at t+period_of_time). The compute_function uses the inputs G, RC, Objs and EgoState. G is the goal of the Ego vehicle or what Ego vehicle intends to do (e.g., make a turn, go straight or go to a waypoint or particular destination). RC is the road context (e.g., a localized map indicating a road network features, such as lanes, lane markings, drivable regions, lane trees, traffic signs, traffic lights, stop signs, etc.). The road context may be a pre-determined or pre-computed localized map. Also, the system 100 may generate the road context as a semantic map and build up the road network features via a simultaneous localization and mapping (a.k.a., SLAM) process. Objs are dynamic objects and static objects in proximity of the Ego vehicle (e.g., vehicles, pedestrians, other things or structures around the Ego vehicle.) EgoState is the trajectory and driving history of the Ego vehicle.

Figure 7B:
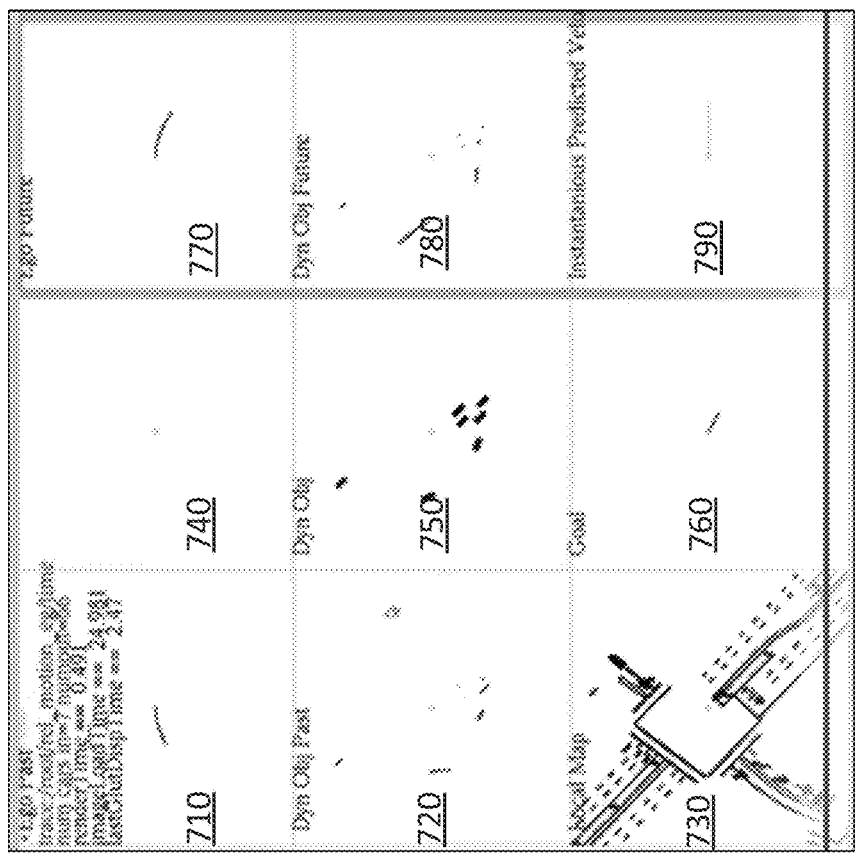
FIG. 7B illustrates an example of driving scenario data use for training a machine learning network.
Figure 7A:
FIG. 7A illustrates an example of driving scenario data use for training a machine learning network.

Referring now to FIGS. 7A-7B, the figures illustrate example driving scenario data 122 and predicted future states of an Ego vehicle. This example illustrates a supervised learning scenario where the inputs are used the system 100 to determine output supervisory signals. The input data are interval time-based snapshots of data showing vehicle movement. In FIGS. 7A-7B, each of the examples include nine sections, Ego Past 710, Dyn Obj Past 720, Local Map 730, Dyn Obj 750, Goal 760, Ego Future 770, Dyn Obj Future 780 and Instantaneous Predicted Velocity 790. Section 740 is not used. The sections Ego Past 710, Dyn Obj Past 720, Local Map 730, Dyn Obj 750, and Goal 760 represents Ego vehicle driving input signals. Ego Future 770, Dyn Obj Future 780 and Instantaneous Predicted Velocity (i.e., the determined control signal) 790 represents output supervisory signals. These output signals represent future positions of the Ego vehicle and the other dynamic objects.

The section Ego Past 710 represents a past trajectory of the Ego vehicle within a predetermined time window (e.g., three seconds) and depicts where the Ego vehicle has traveled within the time window. If the Ego vehicle has not moved within the time window, then the Ego vehicle would be represented as a dot. If the Ego vehicle has moved within the time window, then a line relative to the velocity of the vehicle and/or distance traveled would be displayed.

Similar to the section Ego Past 710, the section Dyn Obj Past 720 represents past trajectories of the other dynamic objects (e.g. other vehicles) within a predetermined time window (e.g., three seconds). If the other vehicles have not moved within the predetermined time window, then the other vehicles are shown with a dot. Another way of understanding this concept is that a longer line indicates that a vehicle has moved a longer distance within the predetermined time window.

The section Local Map 730 represents a schematic of road network topology indicating road lines and related road features for an evaluated area. The local map is a local schematic map displayed relative to a location of the Ego vehicle.

The section Dyn Obj 750 represents positions, as indicated by polygons, for each of the dynamic objects within the area of the map displayed in the Local Map section 730. Section 750 identifies the position and proximity of each of the dynamic objects in relationship to one another at particular time instant.

The section Goal 760 represents the local goal of where the Ego vehicle wants to be (e.g., a waypoint) at the end of a predetermined time window. The system 100 may use different scales or distances for evaluating the goal (e.g., 3 meter goal, 10 meter goal, 100 meter goal, 1 kilometer goal, 5 kilometer goal, 10 meter goal, etc. (the goal is discussed in meters, but may be evaluated in imperial units, such as feet and miles)). For example, the Goal at a 1 kilometer scale may be to go home; however at 100 meter scale may be to take a left turn; at the 10 meter scale the Goal may be to go straight.

The sections Ego Future 770, Dyn Obj Future 780 and Instantaneous Predicted Velocity 790 depict future states of the Ego vehicle and the other vehicles. The system 110 determines Ego Future 770 which represents a predicted ground truth of the intended path or trajectory of the Ego vehicle for a predetermined future time window. The system 110 determines Dyn Obj Future 780 which represents the ground truth or trajectories of the intended path of the other vehicles within the predetermined time window. Here the system 100 determines where the other dynamic objects are predicted to go in the future from the present time instant. The Instantaneous Predicted Velocity 790 is the actual predicted control signal of the Ego vehicle and is a primary control to learn by the system 110. The Ego Future 770 and Dyn Obj Future may be used as co-training signals. In one embodiment, Instantaneous Predicted Velocity is a six-degree vector which includes for the Ego vehicle (3d velocity and 3d angular velocity).

A benefit of defining driving in this manner is that the system 110 may use the inputs to train an agent to determine control signals. One method of training the machine learning network 130 is using imitation learning (e.g., supervised learning), where the system takes the five input signals 710, 720, 730, 750, 760 as inputs and determines the three output control signals 770, 780, 790. Imitation learning is where the system 100 learns the control signals directly from the driving scenario data 122. The system 100 determines the instantaneous predicted velocity 790 at the next time instant as a primary control signal. Also, the machine learning network 130 may be trained through reinforcement learning methods. Reinforcement learning is where the system 100 implicitly learns the control signals by achieving goals from a high-level objective function. In the case of reinforcement learning, the system 100 creates a driving scenario and plays the scenario forward. The system 100 may combine different imitation, reinforcement, and Generative Adversarial Network (GAN) learning methods to train the machine learning network 130.

The machine learning network 130 may be of various network types (e.g., an artificial recurrent neural network (RNN), a feedforward neural network (FNN), or other neural network types). In an RNN, connections between nodes of the network form a directed graph along a temporal sequence. In an FNN, when training the network information only moves forward in one direction from input nodes through any hidden nodes to output nodes. In the FNN, there are no cycles or loops in the machine learning network.

The machine learning network 130 includes policies that keep the dynamic objects (a.k.a., agents) from colliding and also from getting close to colliding. The system 100 may determine a policy over many different dynamic objects. The policy is a heuristic that suggests a particular set of actions in response to a current state of the agent (e.g., a state of a particular dynamic object) and the agent's environment (e.g., the road network topology and other dynamic objects). In other words, the determined action for a particular state of a dynamic object is what action the dynamic object should take based on the dynamic object's state and the dynamic object's surrounding environment. The policy maps the various states to particular actions to be taken by the dynamic object.

In one embodiment, the system 100 trains the machine learning network 130, with a reinforcement learning method by processing the driving scenario data 122 where the driving scenario data 122 includes dynamic objects with trajectories, an initial condition (e.g. a state) and goals (e.g., an intended destination). The system 100 applies a policy to all of the dynamic objects or a sub-group of the dynamic objects based on a particular type of the dynamic object, and the system 100 runs an iterative learning simulation until the goals are achieved or until the dynamic objects crash into one another. After the iterative learning simulation process is performed by the system 100, the system 100 evaluates trajectories, and scores the trajectories based on a predetermined criteria. The predetermined criteria may include one or more of the following: whether a goal was achieved in reasonable or predetermined amount of time; whether a dynamic object did not hit another dynamic object or a static object; whether a path of a dynamic object from a starting position to the intended destination was smooth or efficient; or whether the dynamic object broke any predefined rules. Based on the evaluation, the system 100 updates or modifies policy parameters to better fit the predetermined criteria. Fine tuning the parameters of the policy improves the overall score of the trajectories where the trajectories may better resemble the generated trajectories generated from imitation learning methods.

In another embodiment, the system 110 may train the machine learning network 130 with one general policy across multiple vehicles and then train the machine learning network 130 with specific policies based on certain types of vehicle characteristics and/or driving behaviors. For example, the machine learning network 130 may be trained to learn how to drive like a particular type of vehicle (e.g., a coupe, sedan, truck, delivery truck, motorcycle, etc.). As discussed previously, the dynamic objects may be classified as a particular type of vehicle. For a particular type of vehicle, the system 100 may train the machine learning network 130 to learn how to drive like that particular vehicle (e.g., a coupe, sedan, truck, delivery truck, motorcycle, etc.). The system 100 may identify some or all of the dynamic objects of a particular type and find the trajectories for that type of dynamic object and center on the object and train the machine learning network 130 with those agents. The system 100 may train on dynamic objects of the particular type by selecting them as the ego vehicle in imitation learning or learning a policy in reinforcement learning or GAN learning using only the dynamic objects of the particular type. In other embodiments, the system 100 may train on dynamic objects of multiple types but weight the learning from dynamic objects of a particular type more highly than dynamic objects of different type.

The system 100 may train the machine learning network 130 using one or more of the following driving categories as input states or classifications: type of physical obstacles, drivable regions of the road network, sidewalks, slope of a roadway, surface type of the roadway (e.g., payment, brick concrete, gravel, dirt), drivable regions, weather conditions (e.g., rain, snow, ice, sleet, fog, overcast, sunny, temperature, humidity), traffic signal state, physical height of other dynamic objects (e.g., pedestrians, bicyclists), types of driving behavior (e.g., aggressive, moderate, too slow), geographical location and/or time of day). The system 100 may learn that certain of the input states affect the driving behavior of a dynamic object. For example, the system 100 may train the machine learning network 130 on geographic location, such that the network 130 learns driving behaviors for various geographies (e.g., the system 100 may learn that New York city drivers may drive differently than Los Angeles drivers or San Francisco drivers). For example, the system 100 may choose driving scenarios that meet certain input states or classifications and train on just those driving scenarios in order to train the machine learning network 130 to drive in a manner specific to the particular input state or classification. In other embodiments, system 100 may train on driving scenarios of multiple types but weight driving scenarios of a particular input state or classification more highly than driving scenarios that are not of the particular input state or classification.

The machine learning network 130 learns how to drive and control an agent and/or dynamic object in manner similar to a particular type of vehicle (e.g., a coupe, sedan, truck, delivery truck, motorcycle, etc.) or according to any of the other driving categories discussed above (e.g., type of roadway, weather conditions, geographical location, time of day, etc.). The system 100 may identify and select particular driving scenario data 122 that includes one or more vehicle types and/or one or more driving categories. The system 100 then uses the selected driving scenario data 122 having the particular vehicle types or driving categories to train an agent (e.g., the Ego vehicle), and to train other dynamic objects (e.g., by using reinforcement learning and/or GAN methods). Thus, the machine learning network 130 may learn how to drive an agent in different road network topographies, ambient conditions, weather situations (e.g., learning how to drive in snow conditions), and/or learns how to drive like a particular vehicle type (e.g., a truck or sedan). The system 100 may train on just those selected driving scenarios or weight the selected driving scenarios higher than other driving scenarios during training so that the other driving scenarios have less emphasis or influence on the machine learning network 130 as to the particular vehicle type or driving category.

Additionally, the system 100 may use a Generative Adversarial Network (GAN) and perform a GAN update. A GAN is a process to a make a generative model by having two machine learning networks try to compete with one another. A discriminator tries to distinguish real data from unrealistic data created by a generator. The generator uses random noise or data perturbations to create imitations of the real data in an attempt to trick the discriminator into believing the data is realistic.

The system 100 may evaluate a machine learning network 130 that was generated from the driving scenario data. The machine learning network 130 acts as a generator of data. The system 100 using a discriminator may evaluate the generated data by comparing the generated data against the real data (i.e., the driving scenario data 122) to determine if the generated data looks similar to the real data. The system 100 may use the discriminator to compute a score indicating the extent to which the generated data looks realistic. The system 100, based on the computed scores, may perform a policy update to the machine learning network 130 such that the trajectories of dynamic objects are better enabled to achieve their goals. Over multiple GAN updates, newly generated trajectories created by the generator would look more and more like realistic trajectory data from the original driving scenario data 122. The system 100 may also update the discriminator to better separate the trajectories from the real trajectories.

The system 100 may combine GAN updates and reinforcement learning (RL) updates by defining an RL score that combines achievement of goals with the GAN score (i.e. the discrimination score of each trajectory). At each update iteration in reinforcement learning, training samples are generated by the system 100 by playing out driving scenarios. Then the system 100 makes a policy update to the machine learning network 130 that best averages achievement of goals with how well the goal beat the current discriminator (e.g., as determined by an RL reward function). After a number of iterations, the system updates 100 the discriminator.

The system 100 may also update policy network and the discriminator (which is itself a network). In reinforcement learning, the system 100 has generated sample data that gets played out. The system 100 may generate the sample data, for example, by evaluating the driving scenario data 122 and finding a starting and ending position of vehicles in a particular time window. From this evaluation, the system 100 then has initial conditions and goals for each vehicle in the driving scenario data 122. The system then runs a simulation on this set of sample data for each vehicle simultaneously and determines vehicle trajectories. The vehicle trajectories are then used in the reinforcement learning and RL/GAN updates as discussed above. Additionally, the system may statistically determine starting and ending positions of vehicles from the driving scenario data 122. Additionally, the system 100 may use GAN training to populate scanned maps, and also use GAN to generate maps. This allows the system to generate random topologies and vehicle positions which can be used in the above RL/GAN training. The trained policy network 130 then can be used to drive all these vehicles. The system 100 may generate new driving scenarios using the GAN by generating the maps, initial positions, and goals using the GAN and applying the trained policy network 130 to generate the vehicle trajectories within that context.

Generating New Driving Scenario Data

The system 100 generates various policies so that the dynamic objects learn how to react to the Ego vehicle (the primary agent). The system 100 may perturb and modify the driving scenario data in meaningful ways to generate additional driving scenario data. The system 100 may use the additional driving scenario data to train the machine learning network 130. For example, the system 100 may perturb the current trajectories of the dynamic objects in the driving scenario data 122. The system 100 may change a dynamic object to move faster or slower along its trajectory. In other words, the system 100 may change the velocity of a dynamic object at different time instants or over a time window in a driving scenario. The system 100 may change the placement of the trajectory of a dynamic object to a different location about the map. The system 100 may create a new trajectory for a dynamic object, and in some cases may use the existing velocities of a dynamic object from an existing trajectory for the new trajectory. Lastly, the system 100 may combine some, or all, of the above changes to a trajectory of a dynamic object to generate new driving scenarios.

The system 100 may perturb or change other data in the driving scenario data. For example, a dynamic object moving along one a stretch of a highway may be flipped to another side of the highway. Another change to the driving scenario data is to perturb the local map. For, example, localization could be off by 10 cm, and the localization may be adjusted. The map may be missing parts of lane mark, and the system 100 may add the lane marks. Stops signs or other signs or signals may be missing from the local map, and the signs and signals may be added to the map.

Driving Scenario Classification

The system 100 may classify and/or analyze different driving scenarios to identify interesting or exceptional cases. Referring back to FIGS. 7A and 7B, the system 100 may evaluate the data for each of the sections 710, 720, 730, 750, 760, 770, 780, 790. For each time instant, an Ego vehicle has a signature that is encoded in the data. The system 100 may use a time-series analysis using the data of sections 710, 720, 730, 750, 760, 770, 780, 780. Additionally, the system 100 may perform HMM analysis, clustering analysis, LSTM analysis, encoder/decoder and/or autoencoder compression on the data. For example, by the system 100 performing a clustering analysis on the data, the system 100 may determine driving scenario data that is out of a normal range or a normal driving situation. The system 100 may cluster trajectories of the dynamic objects according to the frequency of occurrence of the trajectory and determine how often a trajectory occurs.

The system 100 may also analysis driving scenario data where the driving scenario data has been annotated with textual or audio descriptors of the type of driving scenario. In this example, the driving scenario data may be augmented with additional descriptive information about the driving scenario. The system 100 may perform a process to search for particular words or texts and organize and/or score the driving scenarios based on the frequency of the occurrence of the particular words. The system 100 may determine a speech vector for the driving scenario, and the system 100 may allow searching on various terminology to find a particular driving scenario. For example, the driving scenario data 122 may have been augmented with the words or audio of "near collision". In response to a request to search for driving scenario data, the system may identify one or more driving scenarios that meet the search criteria of "near collision".

Other interesting driving scenarios that may be identified by the system 100 are vehicles swerving or skidding out of control possibly due to a flat tire. The system 100 may evaluate sudden trajectory movements of the dynamic objects within a predetermined time frame (e.g., identify any sudden movements within a 100 millisecond to 3 second time window). The system 100 may evaluate the driving scenario data 122 and identify random debris falling from a trailer or the back of a truck bed. For example, the system 100 may determine in certain video frames that a smaller group of pixels are separating from a larger pixel group of a dynamic object. The system 100 may classify the smaller group of pixels as possible debris. Additionally, the system 100 may identify from the driving scenario data 122 that certain dynamic objects are quickly decelerating or decelerating and coming a complete stop. The system 100 may classify these driving scenarios as a possible accident. The system 100 then may train the machine learning network 130 as to how other dynamic objects respond to the road debris, vehicles swerving and/or vehicles quickly decelerating.

By performing one or more of the above analyses, the system 100 may determine rare sequences in the data that suggests a unique driving scenario. The system 100 may then catalog and index the unique driving scenarios for use, searching and selection in a simulated 3-dimensional environment.

Providing a Simulated 3-Dimensional Environment

Figure 8:
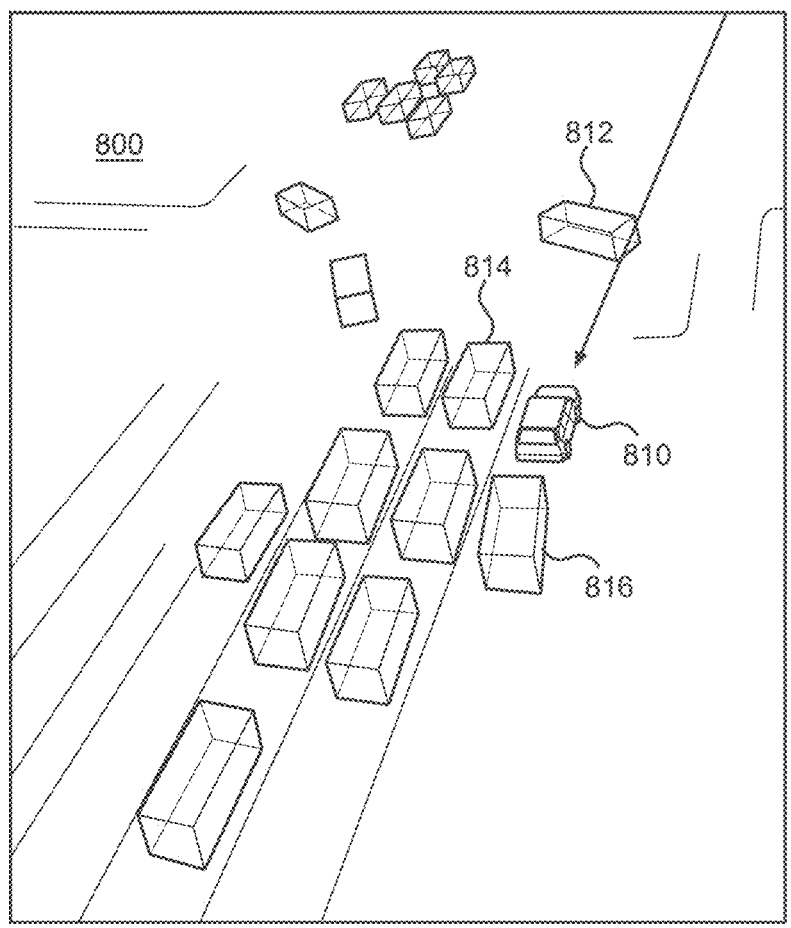
FIG. 8 illustrates an example 3-dimensional simulated environment.

Referring to FIG. 8, an example 3-dimensional simulated environment 800 is depicted. The system 100 provides to external autonomous vehicles systems a 3-dimensional environment in which to simulate real-world driving experiences. The 3-dimensional environment 800 includes dynamic objects 810, 812, 814, 816 and a 3-dimensional point-cloud of the driving environment. The simulator module 108 enables an external autonomous driving system to simulate driving in various driving scenarios. The system 100 provides an API module 110 where external software, applications or other systems may interact with the system 100. Via the API module 110 the external system may experience driving in a simulated environment generated by the simulation module 108. The API module 110 of system 100 provides functions for sending and receiving data and instructions to and from the external system.

The system 100 allows the external autonomous driving system to act as one of the dynamic objects within a driving scenario. In other words, the system 100 allows replacement of a dynamic object in the driving scenario with the external autonomous vehicle. For example, the system 100 may generate a user interface allowing selection of any dynamic object (such as dynamic objects 810, 812, 814, 816) to act as the external autonomous driving system vehicle. In the example, dynamic object 810 has been selected as the primary dynamic object (also referred to as the primary agent) to simulate driving in the 3-dimensional environment according to the driving scenario.

Additionally, the system 100 may automatically select a dynamic object 810, 812, 814, 816 to be used as the primary agent 810 for simulation as the external autonomous vehicle. For example, the system 100 may provide a search input for querying different types of driving scenarios (e.g., a search for a near miss or near collision situation). The system 100 may receive the search criteria and identify a particular driving scenario relevant to the search criteria and load the simulated environment with the identified driving scenario. The system 100 may then automatically select a dynamic object 810, 812, 814, 816 to act as the simulated autonomous vehicle. For example, the system 100 may select one of the vehicles (e.g., dynamic objects) that may be involved in the near miss scenario to be the primary agent 810.

As indicated previously, the dynamic objects in a driving scenario have associated 3-dimensional bounding boxes for dynamic objects. The system 100 may represent the dynamic objects with its 3-dimensional bounding box and/or the system 100 may replace a 3-dimensional bounding box with a 3-dimensional model of a vehicles. For example, dynamic objects 812, 814, 816 are depicted as 3-dimensional bounding boxes, however, the system may depict the dynamic objects as a 3-dimensional vehicle (e.g., as shown with the dynamic object 810). The system 100 may select a 3-dimensional graphical model to replace the bounding box based on the type of the dynamic object (e.g., a sedan, coupe, truck, motorcycle, pedestrian, etc.). The 3-dimensional environment then would represent more accurately a realistic 3-dimensional driving environment.

The API module 110 allows an external autonomous driving system to connect its localization and perception systems to system 100 to simulate a 3-dimensional driving environment. For example, an external autonomous driving system may use different types of sensors to determine its physical environment (e.g. Lidar, radar, Sonar, GPS, distance measuring devices, ultrasonic sensors, laser range finders, front cameras, side camera and/or back camera). The API module 100 provides functions to receive a selection of one or more sensor types that the external autonomous driving system may want to simulate. For example, the external autonomous driving system may want to simulate a front and back camera, GPS, front Sonar, rear Sonar and Lidar. Based on these selected sensor types, the system 100 during the running of a driving scenario would generate simulated sensor data corresponding to the desired sensor types and provide, via the API module 100, the generated simulated data to the external autonomous driving system.

Figure 9A:
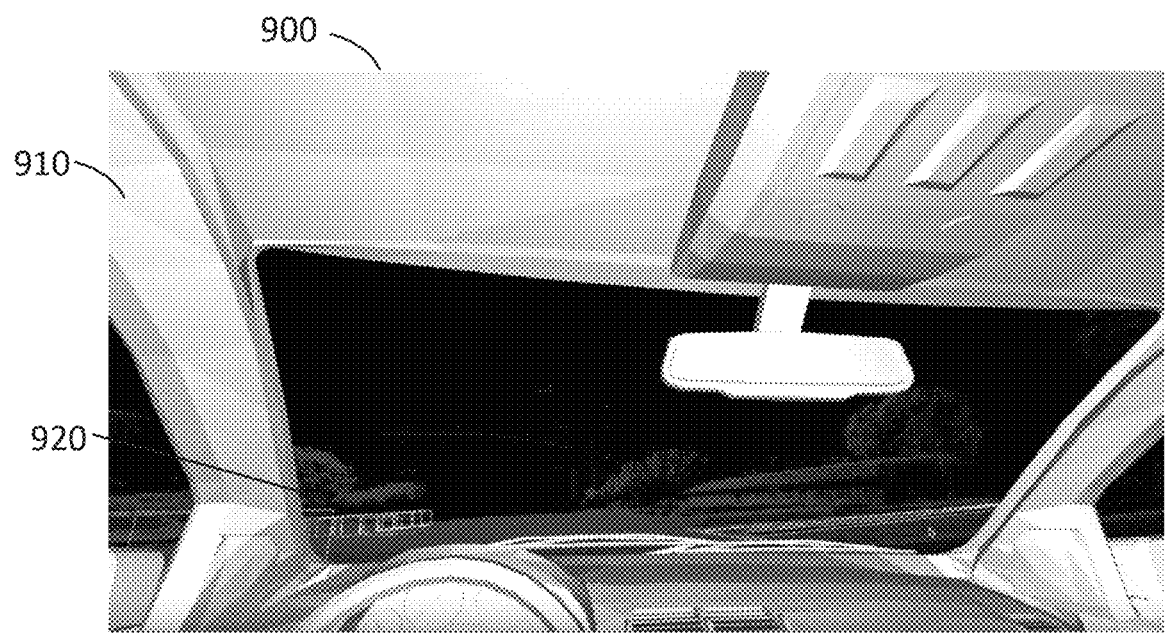
FIG. 9A illustrates an example user interface depicting a 3-dimensional simulated environment.

The system 100 may receive from the external autonomous driving system, characteristics and data about the simulated autonomous vehicle, such as a wire frame or 3-dimensional model of the simulated autonomous vehicle. The system 100 may use the model to display, via a user interface 144 generated by application engine 142, the primary agent 810 in various external 360-degree views in the 3-dimensional environment 800. The model may have identified window views in which simulated interior viewpoints from the primary agent 810 may be generated by the system 100. In other words, the window views allow the system 100 to simulate a person's viewpoint from the interior of the simulated vehicle as shown in FIG. 9A.

Additionally, the received characteristics and data about the simulated autonomous vehicle may include specific locations of the localization and perception system sensors used by the autonomous vehicle. For example, the system 100 may receive data about the specific location on the model or wire-frame of the simulated autonomous vehicle where a sensor (e.g., a camera) is physically located. Using the physical position of the sensors about the simulated autonomous vehicle, the system 100 may then generate accurate simulated received sensor data in the 3-dimensional environment. For example, a simulated autonomous vehicle may have a center front camera positioned on the front bumper 28 inches from a ground plane, while another autonomous vehicle may have a center front camera positioned on the front bumper 36 inches from a ground plane. The system 100 will generate respective simulated camera data from the perspective of the location of the camera on the different autonomous vehicles.

Additionally, the system 100 may receive, via the API module 110, localization and perception system sensor characteristics of the simulated autonomous vehicle. The system 100 may use the sensor characteristics to generate sensor data based on the characteristics of the sensor. For example, different cameras may have different focal lengths and apertures, which would result in different images being obtained by the simulated cameras. In another example, different Lidar sensors may have different operational strengths where the resolution of generated Lidar data may be different. A low strength Lidar sensor may generate low resolution data, while a more powerful Lidar sensor may generate higher resolution data. Using the received Lidar sensor characteristics, the system 100 may generate simulated Lidar data according to the specification of the Lidar sensor received by the system 100 from the external autonomous driving system.

The system 100 may also receive information from the external autonomous driving system as to the vehicle characteristics of the simulated vehicle (e.g., vehicle weight, acceleration profile, deceleration profile). The system 100 may control the physical movement of the primary agent 810 within the 3-dimensional environment according to the vehicle characteristics of the external autonomous vehicle.

The system 100 via the API module 110 may provide vehicle characteristics of the selected primary dynamic object to the external autonomous driving system. For example, the primary agent 810 may be of a particular vehicle type such as a truck or sedan, and may have a certain vehicle weight, acceleration profile and/or deceleration profile. In this example, the system 100 determines the characteristics of the primary agent 810.

The system 100 via the API module 110 may receive commands or instructions to control the primary agent 810. For example, the system 100 may receive inputs from the external autonomous driving system as to braking signals, accelerating signals and/or steering angles. The system 100 may use the received inputs to control the primary agent 810 within the 3-dimensional environment during the running of the driving scenario. The control of the primary agent 810 may be subject to the received vehicle characteristics of the simulated vehicle. For example, the primary agent 810 may accelerate based on the acceleration profile (e.g., an acceleration vector or graph) and decelerate according to a deceleration profile (e.g., a deceleration vector or graph).

During a simulated driving scenario, the system 100 will playback or run a selected driving scenario from a particular time instant forward. The simulated driving scenario continues for a period of time (e.g., from 30 seconds to ninety minutes). During the course of the system 100 running the driving scenario, dynamic objects will maneuver through the 3-dimensional environment according to their historical tracks, velocities and/or trajectories. Ordinarily the dynamic objects in the driving scenario are non-reactive agents (as to the primary agent 810) and will move about the 3-dimensional environment according to the playback of the historical data of the driving scenario. As noted above, however, during the running of a driving scenario the primary agent 810 may be controlled by the external autonomous driving system. In certain situations, the primary agent 810 may be controlled by the external autonomous driving system and maneuver in proximity to one of the other dynamic objects. The system 100 may detect or determine when the primary agent 810 comes into a threshold proximate distance to another dynamic object (e.g., within 10 meters). Additionally, the system 100 may detect a likely impact with another dynamic object based on the velocity and trajectory of the primary agent 810. When the system 100 determines that such a situation has occurred, the system 100 changes an otherwise non-reactive dynamic object to a reactive dynamic object thereby allowing the dynamic object to respond to the actions of the primary agent 810. The actions of the dynamic object as to the primary agent may be based on the learned policies of the machine learning network 130. The dynamic object may perform an action based on its state and the environment. If there are many other dynamic objects in the determined situation, then each of the dynamic objects may become reactive agents and become responsive to the actions of the primary agent 810.

As discussed above, the system 100 provides simulated sensor data to the external autonomous driving system for the autonomous vehicle's localization and perception systems. The system 100 may simulate realistic sensor data for a particular sensor type (e.g., a camera). Based on the physical location of the sensor on the primary agent 810 and the position of the primary agent 810 as to other dynamic objects 812, 814, 816, the system 100 may simulate the primary agent 810 receiving sensor data relative to the dynamic objects 812, 814, 816 in the 3-dimensional environment.

As the primary agent 810 maneuvers within the 3-dimensional environment, the system 100 may determine a geo-spatial coordinate (e.g., a GPS/GNSS coordinate or latitudinal/longitudinal coordinates) of the primary agent 810 in the 3-dimensional environment. The geo-spatial location of the primary agent 810 may be determined by the location of the primary agent 810 as to an underlying base map where the base map is correlated to geo-spatial locations. The system 100 provides the geo-spatial location of the primary agent 810 via the API module 110 to the external autonomous driving system. The system 100 may also degrade the GPS/GNSS signal accuracy based on the location of the primary agent 810. For example, the primary agent 810 may be driving in a city environment with tall buildings (i.e., an urban canyon environment). The system 100 may determine from the local map that surrounding building structures (e.g., based on their heights and/or geometry) would occlude GPS satellites from view of the primary agent's GPS receiver, and the system 100 would then simulate a degradation in the GPS signal accuracy.

The system 100 may adjust the simulated sensor data (e.g., by injecting noise or perturbing the data). While the primary agent 810 is maneuvering within the 3-dimensional environment, the system 100 may generate simulated sensor data and provide the simulated sensor data, via the API module 110, to the external autonomous driving system. The system 100 may perturb the accuracy of the sensor data as to the other dynamic objects 812, 814, 816 and static objects in view of the primary agent 810. For example, if the primary agent 810 uses a camera sensor, then the system 100 may simulate that a vehicle father away from the primary agent 810 in the 3-dimensional environment may be noisier than a vehicle closer to the primary agent 810. In other words, the image of the farther vehicle may be shown as less clear, then the closer vehicle. In another example, if the primary agent 810 uses a Lidar sensor, then the system 100 may simulate that with a vehicle farther away, the simulated Lidar data may be grainer, or of less resolution, than a vehicle or object that is closer to the primary agent 810. Also, with a fixed Lidar sensor (i.e., non-rotating sensor), the data may be simulated with a higher resolution for an object directly in front of the sensor, and the resolution may fall off to the sides of the simulated data. Additionally, the system 100 may determine that certain dynamic objects or other static objects may be out of a predetermined range of a sensors. For example, a sonar sensor may have an effective range of 5 meters, and if the surrounding dynamic and static objects are beyond the threshold effective range of the sensor, then system 100 would not provide sensor data for that particular sensor, or the system may provide, via the API module 110, a message of no data detected. In other words, beyond a certain distance from the primary agent 810, a sensor of the simulated localization and perception system may detect any dynamic or static objects.

The system 100, via the simulation module 108, may provide connected car and/or connected simulation in the 3-dimensional environment. A connected car environment is the concept that autonomous vehicles may wirelessly receive and transmit state information about the vehicle to another nearby autonomous vehicle. By sharing vehicle state information, an autonomous vehicle is better able to navigate within its dynamically changing physical environment. The system 100 may provide the connected car and/or connected environment information to the external autonomous driving system. For example, the primary agent 810 may receive input signals from dynamic objects 812, 814, 816 in proximity of the primary agent 810. The system 100 may determine state information for a dynamic object 812, 814, 816 from the driving scenario data, including, but not limited to: one or more of trajectories, steering angles, rotational velocity, acceleration, deceleration (i.e., braking) rate of speed, and/or geo-spatial coordinate (e.g., a GPS/GNSS coordinate or latitudinal/longitudinal coordinates) of the dynamic objects 812, 814, 816. This connected car data provides information to the primary agent 810 as to how the other dynamic object 812, 814, 816 are moving within environment.

Additionally, the system 100 may simulate traffic signaling devices providing a state of the device, such as a stop light providing a state of green light (e.g., proceed), yellow light (e.g., caution) or red light (e.g. stop) to the primary agent 810.

Figure 9B:
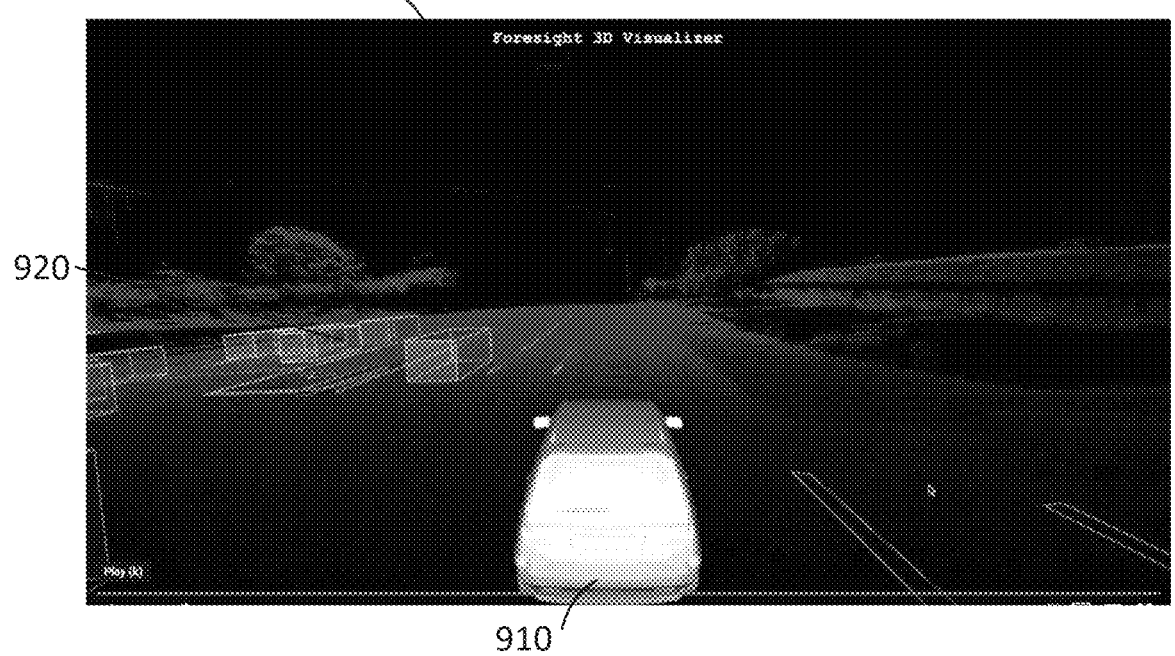
FIG. 9B illustrates an example user interface depicting a 3-dimensional simulated environment.

FIGS. 9A and 9B illustrate an example user interface depicting a 3-dimensional simulated environment 900. The system 100 may generate a simulated 3-dimensional environment 900 from the perspective of the primary agent 910 (e.g., the autonomous vehicle) as shown in FIG. 9A, or a birds-eye view of the primary agent 910 from various perspectives. In FIG. 9A, the other dynamic objects 920 are shown in the left side of the front window, and through the primary agent's 910 driver side window. In FIG. 9B, the primary agent 910 is shown from a rear view. The other dynamic objects 920 are represented by 3-dimensional bounding boxes. The system 100 creates a 3-dimensional environment using point-cloud data representing an actual real-world environment. The system 100 places the dynamic objects in the point-cloud based on positions of the dynamic objects in a particular driving scenario.

To assess the performance of the primary agent 910 for a simulated driving session, the system 100 determines one or more values of a performance score for the autonomous vehicle 910. The system 100 may determine the performance by one more predefined calculations or heuristics. For example, the system 100 may determine the performance score by evaluating one or more: a safety value (e.g. the average distance between the primary agent and the primary agent's surrounding dynamic objects over the course of a driving scenario), a smoothness value (e.g., the average acceleration/deceleration of the primary agent over the course of the driving scenario), an efficiency value (e.g., the time required to achieve the goal of the primary agent from a beginning location to a destination location, or the average speed of the primary agent for the goal or for the overall driving scenario). In one embodiment, the system 100 calculates the performance score using the weighted sum of the following values: performance_score=weight_1*safety_distance+weight_2*average_speed−weight_3*average_acceleration.

In another embodiment, the system 100 may determine a performance score of the primary agent 910 by determining the difference between original-recorded 3-dimensional positions of the original vehicle from the original driving scenario as to the computed 3-dimensional positions of the primary agent 910 in the simulated driving session. The less difference there is between the historical data of the original driving scenario and the real computed data of the simulated session, the higher (i.e., better) performance score would be calculated by the system 100. This is so because the vehicle motion of the primary agent 910 in the simulated session is closer to the natural driving behavior of the original vehicle in the original driving scenario.

In yet another embodiment, the system 100 may determine a driving performance score of the primary agent 910 by training the machine learning network 130 based on a regression model to compute a performance score of a recorded vehicle's behavior. The system 100 may receive rankings (e.g., poor, fair, good) by one or more users as to the simulated vehicle trajectory of the primary agent 910. In other words, a user may provide an assessment as to the simulated vehicles trajectory in a simulated session. The received rankings may be summarized by the system to calculate a performance score for the driving scenario. Moreover, the system 100 may compute similarity between the recorded trajectory and a large set of historical real-world trajectories.

Figure 10:
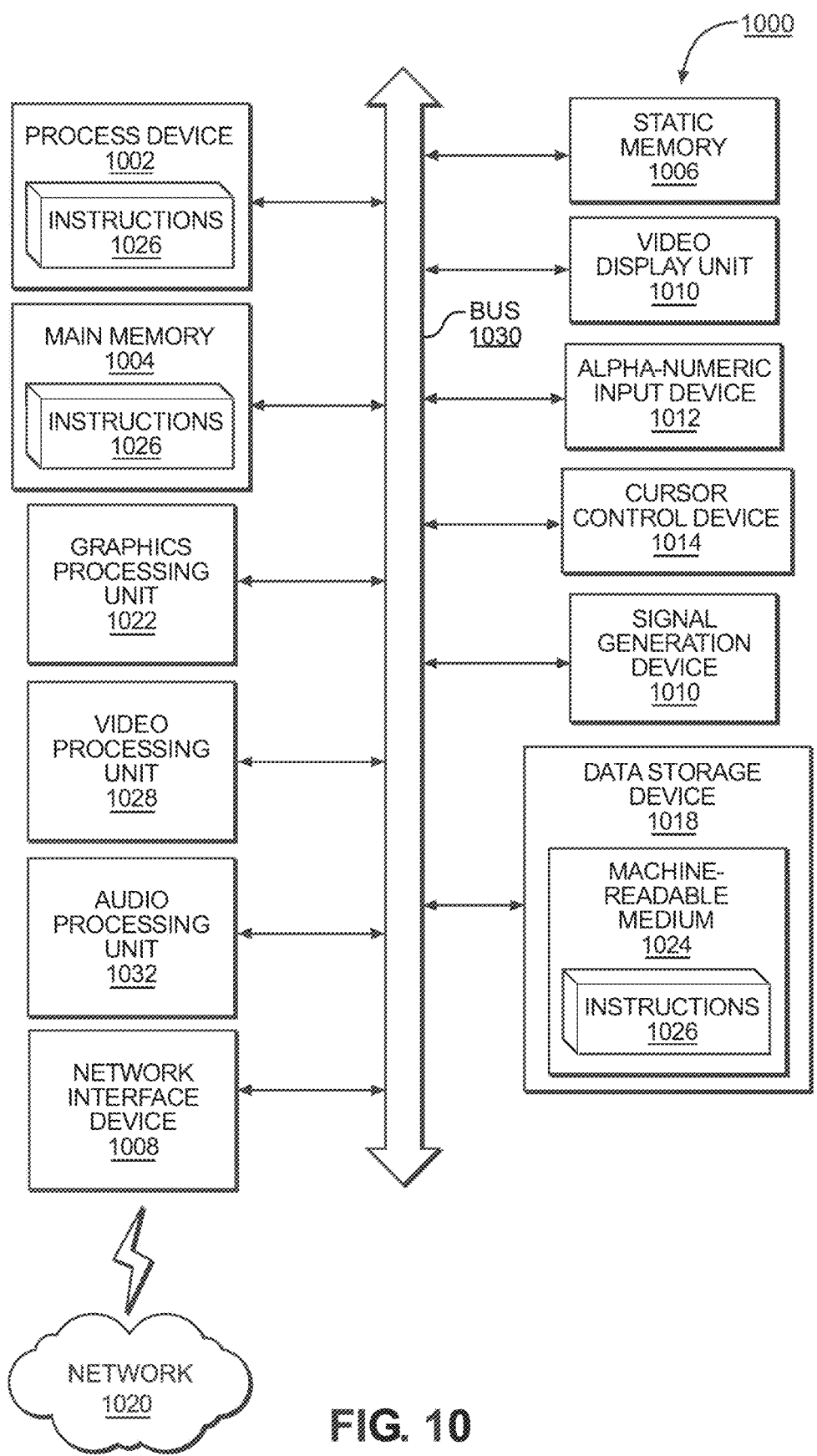
FIG. 10 illustrates an example machine of the computer system.

FIG. 10 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein.

The computer system 1000 may further include a network interface device 908 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a computer-readable medium) on which is stored one or more sets of instructions or software 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In one implementation, the instructions 1026 include instructions to implement functionality corresponding to the components of a device to perform the disclosure herein. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising one or more processors, and a non-transitory computer-readable medium including one or more sequences of instructions that, when executed by the one or more processors, cause the system to perform operations comprising:
    receiving video data, the video data comprising multiple video frames depicting an aerial view of vehicles moving about an area;
    generating driving scenario data based on the received video data, the driving scenario data comprising information about one or more dynamic objects;
    training a machine learning network based on the generated driving scenario data, wherein the machine learning network is configured:
    to receive, for multiple time instants, values of the generated driving scenario data including:
        a past trajectory of a first dynamic object;
        a past trajectory for each of one or more other dynamic objects;
        a road network topology relative to a location of the first dynamic object;
        positions of the first and one or more other dynamic objects; and
        an intended destination of the first dynamic object, the intended destination within the road network topology; and
    to determine, for each of the multiple time instants:
        a predicted path of the first dynamic object;
        a predicted path of the one or more other dynamic objects; and
        a predicted velocity of the first dynamic object.

2. The system of claim 1, wherein generating driving scenario data further comprises:
    identifying the one or more dynamic objects in two or more videos frames of the video; and
    determining a trajectory of the one or more identified dynamic objects and a velocity of the one or more identified dynamic objects.

3. The system of claim 1, wherein training the machine learning network further comprises:
    training the machine learning network to generate a control signal by evaluating the input signals of one or more of a local road network, a location of primary dynamic object, locations of secondary dynamic object, a trajectory of the primary dynamic object, and trajectories of the secondary dynamic object.

4. The system of claim 1, wherein training the machine learning network further comprises:
    determining a policy based on evaluating the motion of one or more dynamic objects from the generated driving scenario data.

5. The system of claim 1, wherein training the machine learning network further comprises:
    modifying the generated scenario data to change data values for one or more of a goal of a dynamic object, a location of a dynamic object, a local map characteristic, a trajectory of a dynamic object and a velocity of a dynamic object.

6. The system of claim 1, wherein training the machine learning network further comprises:
    training the machine learning network to generate one or more control signals of a predicted instantaneous velocity of a dynamic object, a predicted trajectory of a dynamic object and a predicted velocity of a dynamic object.

7. A method implemented by a system comprising one or more processors, the method comprising:
    receiving video data, the video data comprising multiple video frames depicting an aerial view of vehicles moving about an area;
    generating driving scenario data based on the received video data, the driving scenario data comprising information about one or more dynamic objects; and
    training a machine learning network based on the generated driving scenario data, wherein the machine learning network is configured:
    to receive, for multiple time instants, values of the generated driving scenario data including:
        a past trajectory of a first dynamic object;
        a past trajectory for each of one or more other dynamic objects;
        a road network topology relative to a location of the first dynamic object;

positions of the first and one or more other dynamic objects; and an intended destination of the first dynamic object, the intended destination within the road network topology; and to determine, for each of the multiple time instants:

a predicted path of the first dynamic object;

a predicted path of the one or more other dynamic objects; and a predicted velocity of the first dynamic object.

8. The method of claim 7, wherein generating driving scenario data further comprises:

identifying the one or more dynamic objects in two or more videos frames of the video; and determining a trajectory of the one or more identified dynamic objects and a velocity of the one or more identified dynamic objects.

9. The system of claim 7, wherein training the machine learning network further comprises:

training the machine learning network to generate a control signal by evaluating the input signals of one or more of a local road network, a location of primary dynamic object, locations of secondary dynamic object, a trajectory of the primary dynamic object, and trajectories of the secondary dynamic object.

10. The method of claim 7, wherein training the machine learning network further comprises:

determining a policy based on evaluating the motion of one or more dynamic objects from the generated driving scenario data.

11. The method of claim 7, wherein training the machine learning network further comprises:

modifying the generated scenario data to change data values for one or more of a goal of a dynamic object, a location of a dynamic object, a local map characteristic, a trajectory of a dynamic object and a velocity of a dynamic object.

12. The method of claim 7, wherein training the machine learning network further comprises:

training the machine learning network to generate one or more control signals of a predicted instantaneous velocity of a dynamic object, a predicted trajectory of a dynamic object and a predicted velocity of a dynamic object.

13. The system of claim 1, further comprising the operations of:

generating new driving scenario data, comprising:

modifying values for the trajectories of the generated driving scenario data; and training the machine learning network using the new driving scenario data wherein the new driving scenario includes the generated driving scenario data with changes in values to trajectories of the one or more dynamic objects.

14. The method of claim 1, the operations further comprising:

generating new driving scenario data, comprising:

modifying values for the trajectories of the generated driving scenario data; and training the machine learning network using the new driving scenario data wherein the new driving scenario includes the generated driving scenario data with changes in values to trajectories of the one or more dynamic objects.

* * * * *